Figure 1:
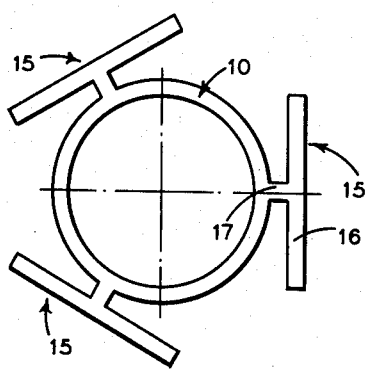

Feb. 5, 1963 M. CHRISTENSEN 3,076,261
SELF-LEVELING WELDING RING WITH PROJECTING EARS
Filed July 22, 1957

INVENTOR.
Magnus Christensen
BY
*J. P. Moran*
ATTORNEY

United States Patent Office 3,076,261
Patented Feb. 5, 1963

3,076,261
SELF-LEVELING WELDING RING WITH
PROJECTING EARS
Magnus Christensen, Alliance, Ohio, assignor to The Babcock & Wilcox Company, New York, N.Y., a corporation of New Jersey
Filed July 22, 1957, Ser. No. 673,354
5 Claims. (Cl. 29—491)

This invention relates to the butt welding of tubes end-to-end and, more particularly, to a novel weld backing ring for properly aligning the tube ends to be joined and forming the root of the butt weld.

When fusion butt welds are required to join tubular elements in the shop or in the field, the usual practice is to "back-up" the welded joint by means of a metal backing ring placed inside the elements in spanning relation with the abutting ends. The backing ring thus forms a continuous solid member as a base for the initial weld pass which joins the root edges of the machined or ground V-groove or U-groove to the backing ring. The latter is at least partially, and preferably, completely fused to form an integral part of the welded joint.

Such backing rings are usually a necessity in butt welding tubular elements, in order to obtain a uniformly satisfactory inside surface. When it is attempted to form a butt weld between tubular members without using a backing ring, a high degree of manipulative skill is required to avoid burning through the root, forming objectionable projections on the inner surface, or to avoid forming equally objectionable area of non-fusion between the tube ends and the weld deposit. In practice, a satisfactory fusion butt weld between tubular elements is difficult if not impossible to obtain without the use of a backing ring. While certain welding techniques and processes can be used to produce satisfactory root weld or initial passes, these techniques and processes leave something to be desired with respect to assurance of quality of the welded joint and have in common the disadvantage of difficulty in controlling penetration.

The use of backing rings in forming fusion butt welds between tubular elements promotes confidence in the welding operator and permits a welder of average skill to produce a joint which is satisfactory from the standpoint of internal projections and unfused areas. However, while many thousands of these joints formed with backing rings have given satisfactory service for years, failures have occurred in defective welds containing stress-raising notches. In addition, the backing rings projecting on the inner surface of the joints obstruct uniform fluid flow, and the turbulence caused by the inside projections has promoted failure of the joint by cavitation and erosion. All of these factors have resulted in a growing dissatisfaction with fusion butt welded joints involving backing rings on the inner surface of the joints.

In accordance with the present invention, a self-aligning, welding filler ring or backing ring is provided which is disposed between the ends of the tubular elements and with little or no projection from the inner surfaces of the elements. Thereby, the ring not only assures good fit up of the elements but also offers substantially no obstruction to fluid flow while providing the required solid backing for the weld promoting operator confidence.

More specifically, the metal welding ring of the present invention comprises a flat annular section having an inner diameter equal to, or very slightly less than, the inner diameter of the tubular elements, and formed with three or more T-shape projections, or "ears," equally spaced about its outer periphery and lying in the plane of the annular section. The heads of the T-shape projections are substantially tangent to the outer diameter of the tubular elements. The ring may be formed simply and economically by stamping from a flat metal sheet.

In using the ring, two of the T-shape ears are twisted about their stems so that their heads or crosses are perpendicular to the plane of the ring. The ring is then placed between the tubular elements with these two heads engaging the outer surfaces of the latter. The remaining ear or ears are then twisted in a same manner to provide a multi-point engagement of the heads of the ears with the outer surfaces of the tubular elements, thus accurately aligning the tubular elements with each other and with the ring. The inner rim of the ring is flush with the inner surfaces of the tubular elements or projects very slightly (0.025") inwardly of such surfaces.

The ring is then tack welded to the tubular elements at the weld groove. Then all the ears are twisted off and the initial fusion weld pass is made fusing the ring and the inner edges of the tube ends to each other. Additional weld passes are then made to complete the joint.

With this ring, fit-up of the parts is readily and accurately effected, burn through is minimized or eliminated, and there is no substantial projection of the ring beyond the inner surface of the joint. The ring lends itself readily to inert gas arc welding, and can also be used with open arc coated electrode welding or with oxyfuel gas welding.

For an understanding of the invention principles, reference is made to the following description of a typical embodiment thereof as illustrated in the accompanying drawing.

Figure 3:
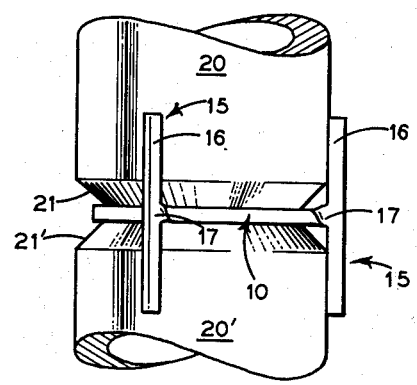
Figure 2:
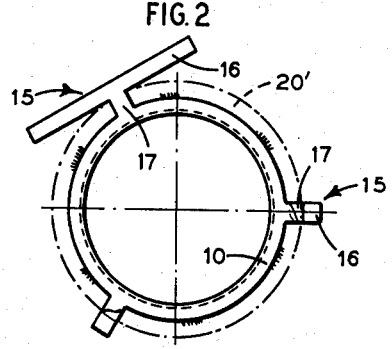
Figure 4:
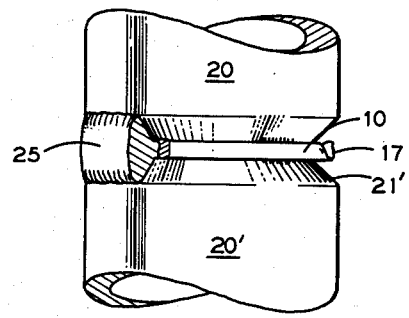
Figure 5:
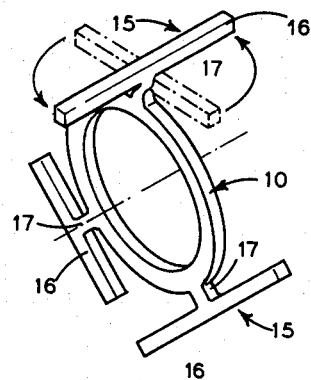

In the drawing:
FIG. 1 is a plan view of the welding ring before use;
FIG. 2 is a similar view of the ring with two ears bent at right angles to the annular section, the aligning relation of the ring with a tubular element being indicated by the broken lines;
FIG. 3 is an elevation of the ring and tubular elements just prior to welding;
FIG. 4 is an elevation view, partly in section, illustrating formation of the fusion weld subsequent to tack welding of the ring to the elements and removal of the ears; and
FIG. 5 is a perspective view of the ring illustrating twisting of an ear.

Referring to FIG. 1, the welding filler ring forming the subject matter of this invention is a substantially flat or plate-like metal member comprising an annular section 10 having a plurality of T-shape ears or projections 15 evenly spaced about its outer periphery and lying in the same plane as section 10. The inner diameter of annular section 10 is substantially equal to the inner diameter of tubular elements 20, 20' to be fusion butt welded in end-to-end relation. Also, the heads or crosses 16 of ears 15 are substantially tangent to the outer surfaces of elements 20, 20'.

If desired, the inner diameter of annular section 10 may be slightly less than the inner diameter of elements 20, 20'. For example, section 10, when the backing ring is in position, may project 0.025" into the interior of tubular elements 20, 20'. While three ears 15 are illustrated by way of example, a greater number of ears may be provided where necessary or desirable.

Referring to FIG. 2, when the ring is to be used in forming a fusion butt weld, the heads 16 of two of the ears 15 are bent substantially 90° by twisting of stems 17. Heads 16 thus extend at right angles to annular section 10 and project on either side thereof. The thus distorted ring is then placed on the contoured end 21' of element 20', for example, with the bent heads 16 engaging the outer surface of the element. The head 16 of the third ear 15 is then similarly twisted about its stem 17 so that the ring is firmly positioned and aligned on element 20' with the annular section 10 engaging the contoured end of the element. The second tubular element 20 is then telescoped inside the bent up heads 16 of the ears so that its contoured end 21 abuts the opposite surface of annular section 10 as shown in FIG. 3.

The welding ring is then tack welded to surfaces 21, 21' of the tubular elements thus holding all the components firmly in axial alignment. After the components are thus rigidly aligned, heads 16 are twisted off stems 17, as shown in FIG. 4, and the welding groove formed by contoured surfaces 21, 21' is filled with weld metal 25 which is fused to elements 20, 20' and to the welding ring. Preferably, the welding ring, now comprising annular section 10 and stems 17 of ears 15, is completely fused into the weld.

The annular section 10 forms a root for the weld preventing burn through. After fusion of this section, there is practically no projection into the interior of the joint. The ring is rapidly and easily prepared for use, and positioned on the tubular components. In addition to acting as a weld backing ring, it also serves as an aligning jig for the elements 20, 20'.

FIG. 5 more clearly illustrates how the ears 15 are twisted prior to placing the welding ring in position.

While specific embodiments of the invention have been shown and described in detail to illustrate the application of the invention principles, it will be understood that the invention may be embodied otherwise without departing from such principles.

What is claimed is:

1. A process of butt welding tubular members end to end comprising the step of tapering the adjacent ends of said tubular members to be joined, disposing a backing ring having a plurality of ears integrally connected to the outer periphery of said ring between the ends to be joined so that the inner periphery of said ring is substantially flush with the internal walls of said tubular members, twisting said ears so that in welding position said ears are disposed parallel to the axis of said tubular members and tangent to the outer periphery of said members for insuring accurate alignment of said members, tack welding said ring to said aligned tubular members, removing said ears, and fusion welding the ring and adjacent tubular ends together.

2. A process of butt welding tubular members end to end comprising the step of disposing the ends of said tubular members to be joined in relative axial alignment, disposing a backing ring having a plurality of distortable ears integrally connected to the outer periphery thereof between the ends to be joined so that the inner periphery of said ring is substantially flush to the internal wall of said tubular members, twisting said ears so that in welding position said ears are disposed parallel to the axis of said tubular members and tangent to the outer periphery of said tubular members for insuring accurate alignment of said members, tack welding said ring to said aligned tubular members, removing said ears, and fusion welding the ring and adjacent tubular ends together.

3. A welding filler ring for use in positioning and butt welding tubular elements in end to end relationship comprising a substantially flat relatively thin metal member defining a closed annular section having an inner diameter substantially equal to that of the tubular elements to be joined and an outer diameter less than the outer diameter of the tubular elements, and a plurality of outwardly extending ears having a stem and connected crosshead, said stems being integrally connected to the outer periphery of said member so that the cross-heads are spaced from the outer periphery of said annular section, said ears being normally disposed in co-planar relationship with respect to said closed annular section whereby said cross-heads are tangent to a circle having a diameter substantially equal to the outer diameter of said tubular elements, and said ears being readily distortable about their stem so that their respective cross-heads are positioned substantially normal to the plane of said member.

4. A welding filler ring for use in positioning and butt welding tubular elements in end-to-end relationship comprising a substantially flat relatively thin metal member defining a ring, said ring having a plurality of ears integrally connected to the outer periphery of said ring and extending radially outward therefrom, said ears being normally disposed in co-planar relationship with respect to said ring whereby said ears are tangential to a circle having a diameter substantially equal to the outer diameter of said tubular elements, and said connection between each ear and said ring having a relatively small transverse cross-sectional area to permit said ear to be readily deformable to a position normal to the plane of said ring and tangential to the outer surface of said tubular elements prior to welding.

5. A welding filler ring for use in positioning and butt welding a pair of axially aligned tubular elements in end-to-end relationship comprising a substantially flat relatively thin metal member defining a ring, said ring having an inner diameter substantially equal to that of the tubular elements to be joined, and a plurality of ears having a stem integrally connected to the outer periphery of said ring and extending radially outward therefrom, said ears being normally disposed in co-planar relationship with respect to said ring whereby said ears are tangential to a circle having a diameter substantially equal to the outer diameter of said tubular elements, said stem between each ear and said ring having a relatively small transverse cross-sectional area to permit said ear to be readily deformable about its stem to a position normal to the plane of said ring and tangential to the outer surface of said tubular elements prior to welding.

References Cited in the file of this patent

UNITED STATES PATENTS

| | | |
|---|---|---|
| 926,246 | Dorff | June 29, 1909 |
| 1,627,765 | Bates | May 10, 1927 |
| 1,939,772 | Greene | Dec. 19, 1933 |
| 1,980,561 | Wagner | Nov. 13, 1934 |
| 1,981,850 | Fisher | Nov. 27, 1934 |
| 1,995,546 | Meier | Mar. 26, 1935 |
| 2,132,575 | Moise | Oct. 11, 1938 |
| 2,352,127 | Sheldon | June 20, 1944 |
| 2,399,815 | Martin | May 7, 1946 |
| 2,448,107 | Mattimore et al. | Aug. 31, 1948 |
| 2,458,686 | Davie | Jan. 11, 1949 |
| 2,463,006 | Vander Clute | Mar. 1, 1949 |
| 2,646,995 | Thompson | July 28, 1953 |
| 2,764,426 | Von Ahrens | Sept. 25, 1956 |
| 2,798,286 | Anderson | July 9, 1957 |